US009846843B2

(12) United States Patent
Howard et al.

(10) Patent No.: US 9,846,843 B2
(45) Date of Patent: Dec. 19, 2017

(54) METHODS AND SYSTEMS FOR FACILITATING INTERACTIONS BETWEEN A ROBOT AND USER

(71) Applicant: Georgia Tech Research Corporation, Atlanta, GA (US)

(72) Inventors: Ayanna Howard, Atlanta, GA (US); LaVonda Brown, Atlanta, GA (US); Hae Won Park, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 498 days.

(21) Appl. No.: 14/524,405

(22) Filed: Oct. 27, 2014

(65) Prior Publication Data
US 2015/0120043 A1   Apr. 30, 2015

Related U.S. Application Data

(60) Provisional application No. 61/897,406, filed on Oct. 30, 2013.

(51) Int. Cl.
*G06N 5/04* (2006.01)
*B25J 11/00* (2006.01)

(52) U.S. Cl.
CPC .............. *G06N 5/04* (2013.01); *B25J 11/003* (2013.01); *B25J 11/0005* (2013.01)

(58) Field of Classification Search
CPC ....... G06N 5/04; B25J 11/0005; B25J 11/003; B25J 9/1656
(Continued)

(56) References Cited

U.S. PATENT DOCUMENTS 8,172,724 B2   5/2012   Solomon
8,206,267 B2   6/2012   Holden et al.
(Continued)

FOREIGN PATENT DOCUMENTS

| CN | 102672702 | 9/2012 |
| CN | 103280126 | 9/2013 |
| KR | 20130104777 | 9/2013 |

OTHER PUBLICATIONS

Park H. et al., "Case-Based Reasoning for Planning Turn-Taking Strategy with a Therapeutic Robot Playmate", Proceedings of the 2010 3rd IEEE RAS & EMBS International Conference on Biomedical Robotics and Biomechatronics, The University of Tokyo, Tokyo, Japan, Sep. 26-29, 2010.*
Park H., "Robot Learners: Interactive Instance-Based Learning with Social Robots", Doctoral Thesis, May 2014.*
Park H. et al., "Using a Shared Tablet Workspace for Interactive Demonstrations during Human-Robot Learning Scenarios",2014 IEEE International Conference on Robotics & Automation (ICRA) Hong Kong Convention and Exhibition Center May 31-Jun. 7, 2014. Hong Kong, China.*
(Continued)

*Primary Examiner* — Dave Misir
(74) *Attorney, Agent, or Firm* — Myers Bigel, P.A.

(57) ABSTRACT

Methods and systems for facilitating interactions between a robot and user are provided. The system may include a robot and an electronic device communicatively coupled to the robot. The robot may include a plurality of actuators ones of which are configured to cause a mechanical action of at least one component of the robot, a plurality of interaction inducing components operatively connected to corresponding ones of the plurality of actuators, at least one sensor configured to detect at least one action of a user, a processor, and a memory coupled to the processor, the memory including computer readable program code embodied therein that, when executed by the processor, causes the processor to: receive a task; identify, based on similarity to the task received, a similar task from a database stored in the memory, the database including at least one stored task-solution pair; execute the solution associated with the simi-
(Continued)

lar task; and store a new task-solution pair responsive to the robot performing a solution relating to the task.

19 Claims, 3 Drawing Sheets

(58) Field of Classification Search
USPC .............................. 706/12; 700/246; 901/46
See application file for complete search history.

(56) References Cited

U.S. PATENT DOCUMENTS

| | | | | |
|---|---|---|---|---|
| 8,386,078 | B1* | 2/2013 | Hickman | G06F 17/30194 318/568.1 |
| 2009/0055019 | A1 | 2/2009 | Stiehl et al. | |
| 2009/0306823 | A1* | 12/2009 | Baltes | G05D 1/0274 700/245 |
| 2012/0109025 | A1 | 5/2012 | Weinberg et al. | |
| 2012/0185090 | A1* | 7/2012 | Sanchez | G06N 3/008 700/253 |
| 2012/0190453 | A1 | 7/2012 | Skaff et al. | |
| 2013/0078600 | A1* | 3/2013 | Fischer | G09B 19/00 434/236 |
| 2013/0158707 | A1 | 6/2013 | Lee et al. | |
| 2013/0323698 | A1 | 12/2013 | Gifford et al. | |
| 2013/0345873 | A1* | 12/2013 | Blumberg | B25J 9/0087 700/259 |
| 2014/0249676 | A1* | 9/2014 | Florencio | B25J 9/1694 700/259 |

OTHER PUBLICATIONS

Park H., "Task-Learning Policies for Collaborative Task Solving in Human-Robot Interaction", ICMI'12, Oct. 22-26, 2012, Santa Monica, California, USA.*
Roberts L. et al., "Robots and Therapeutic Play: Evaluation of a Wireless Interface Device for Interaction with a Robot Playmate", 34th Annual International Conference of the IEEE EMBS San Diego, California USA, Aug. 28-Sep. 1, 2012.*
Han, Jeonghye, "Emerging Technologies: Robot Assisted Language Learning", *Language Learning & Technology*, 2012, 16(3): 1-9.
Kanajar et al., "Neptune: Assistive Robotic System for Children with Motor Impairments", *PETRA*, 2011, 6 pages.
Ljunglof et al., "Lekbot: A talking and playing robot for children with disabilities", *Proceedings of the Second Workshop on Speech and Language Processing for Assistive Technologies*, 2011, pp. 110-119.
Park et al., "Assistive Robotics", *HumAnS Lab*, 2013, humanslab. ece.gatech.edu/humanslab/Assistive.html, 3 pages.
Park et al., "Providing Tablets as Collaborative-Task Workspace for Human-Robot Interaction", *ACM/IEEE International Conference on Human-Robot Interaction (HRI)*, 2013, 2 pages.
Sitdhisanguan et al., "Using tangible user interfaces in computer-based training systems for low-functioning autistic children", *Personal and Ubiquitous Computing*, 2012, 16: 143-155.
Yirka, Bob, "Startup 'Play-i' using friendly robots to teach kids computer programming", 2013, http://phys.org/news/2013-10-startup-play-i-friendly-robots-kids.html, 2 pages.

* cited by examiner

METHODS AND SYSTEMS FOR FACILITATING INTERACTIONS BETWEEN A ROBOT AND USER

RELATED APPLICATIONS

This application claims the benefit of and priority under 35 U.S.C. §119 to U.S. Provisional Application No. 61/897,406, filed Oct. 30, 2013, the disclosure of which is hereby incorporated herein by reference in its entirety.

STATEMENT OF GOVERNMENT SUPPORT

This invention was made with government support under contract number HS-1208287 awarded by the National Science Foundation. The government has certain rights in the invention.

BACKGROUND

The interest for social robots is becoming greater as more applications emerge that demonstrate a benefit from interaction between human and robot. For example, robots may contribute in educational, therapeutic, and/or entertaining environments. Children, including those with disabilities, may benefit from interacting with a robot in various environments and/or as a social companion.

SUMMARY

Some embodiments of the present invention are directed to a system including a robot and an electronic device that is communicatively coupled to the robot. The robot may include a plurality of actuators that are configured to cause a mechanical action of at least one component of the robot, a plurality of interaction inducing components operatively connected to corresponding ones of the plurality of actuators, at least one sensor that is configured to detect at least one action of a user, a processor, and a memory coupled to the processor, the memory including computer readable program code embodied therein. According to some embodiments, the memory includes computer readable program code embodied therein that, when executed by the processor, causes the processor to: receive a task, identify, based on similarity to the task received, a similar task from a database stored in the memory, the database including at least one stored task-solution pair, execute the solution associated with the similar task, and store a new task-solution pair responsive to the robot performing a solution relating to the task.

In some embodiments, the processor is configured to receive data corresponding to the at least one action of the user. In some embodiments, the processor receives the data from the electronic device and/or from the at least one sensor.

In some embodiments, the data includes information on at least one interaction between the user and the electronic device.

Some embodiments include that the robot is configured to identify the data as the task.

In some embodiments, the new task-solution pair is different than a stored task-solution pair.

Some embodiments include that the task and the similar task are the same. In some embodiments, the robot performs a new solution relating to the task, and, responsive to the robot performing the new solution relating to the task, the new task-solution pair is stored.

Some embodiments include that the task and the similar task are different. In some embodiments, the robot performs the solution relating to the task, and, responsive to the robot receiving the task and performing the solution relating to the task, the new task-solution pair is stored.

In some embodiments, the similar task is identified by having the most similarities to the task relative to at least one stored task in the database. Some embodiments include that the similar task is identified by a metric corresponding to pattern recognition.

In some embodiments, the similar task is identified by estimating the distance between the task and a stored task in the database. In some embodiments, estimating the distance between the task and the stored task in the database includes mathematically weighting the distance between the task and the stored task.

In some embodiments, the similar task is identified by determining the frequency of the task.

Some embodiments include storing the new task-solution pair responsive to the robot learning the solution relating to the task.

In some embodiments, the solution relating to the task corresponds to at least one action of the user. Some embodiments include that at least one action of the user is responsive to the robot performing the solution associated with the similar task and/or an action subsequent to the robot performing the similar task. In some embodiments, at least one action of the user is responsive to the robot performing the solution associated with the similar task and/or an action subsequent to the robot performing the similar task and corresponds to an interaction between the user and the electronic device.

In some embodiments, the database includes a plurality of stored task-solution pairs that are associated with and/or organized by a scoring metric. Some embodiments include that the scoring metric corresponds to the user's performance relating to a stored task of a stored task-solution pair of the plurality of stored task-solution pairs.

Some embodiments include that the processor is configured to determine if the new task-solution pair is within a threshold of at least a portion of the plurality of stored task-solution pairs, and wherein, responsive to determining that the new task-solution pair is within the threshold of at least a portion of the plurality of stored task-solution pairs, disregarding the new task-solution pair. In some embodiments, the threshold is a distance threshold corresponding to a distance in dataspace between different task-solution pairs.

In some embodiments, the task corresponds to the user's performance relating to an interaction between the user and the electronic device. Some embodiments include that the user's performance is categorized as correct, incorrect, or inactive.

In some embodiments, the solution corresponds to an action of the robot responsive to the task. In some embodiments, the action of the robot is a verbal and/or nonverbal response. The nonverbal response may include at least one of a head nod, head shake, eye gaze, head scratch, arm movement, wheel movement, and leg movement. The verbal response may include at least one of a positive response, a supportive response, and a motivational response.

In some embodiments, the robot is configured to receive the data corresponding to at least one action of the user and identify the data as the task. In some embodiments, at least one action of the user includes the performance of the user.

Some embodiments include that the robot is configured to transmit data to the electronic device, the data corresponding to a synthesized touch action on the electronic device.

In some embodiments, a method of increasing user participation in an activity performed on an electronic device is provided. The method may include providing a robot including a plurality of actuators that are configured to cause a mechanical action of at least one component of the robot; a plurality of interaction inducing components operatively connected to corresponding ones of the plurality of actuators; at least one sensor configured to detect at least one action of a user; a processor; and a memory coupled to the processor, the memory comprising computer readable program code embodied therein that, when executed by the processor, causes the processor to: receive a task; identify, based on similarity to the task received, a similar task from a database stored in the memory, the database including at least one stored task-solution pair; execute the solution associated with the similar task; and/or store a new task-solution pair responsive to the robot performing a solution relating to the task, wherein the robot facilitates user participation in the activity, thereby increasing user participation in the activity on the electronic device.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Figure 1:
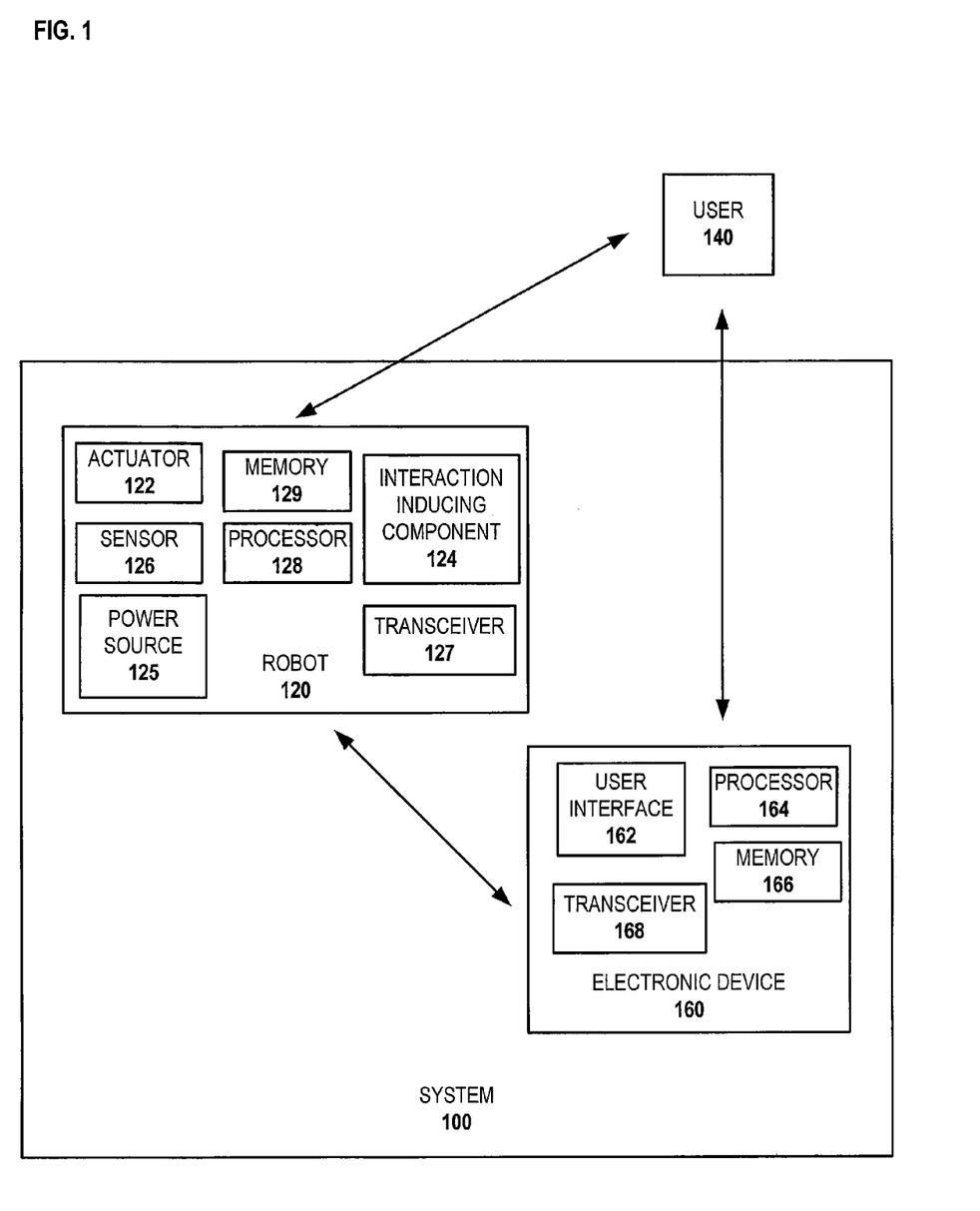
FIG. 1 is a block diagram illustrating systems for facilitating an interaction between a robot and user according to some embodiments of the present invention.

Reference is now made to FIG. 1, which is a block diagram illustrating a system 100 for facilitating interactions between a robot 120 and a user 140 according to some embodiments of the present invention. In some embodiments, a system 100 as disclosed herein may facilitate interactions between a robot 120 and a user 140, such as, for example a child and/or adolescent including a child and/or adolescent with mental and/or learning disabilities. In some embodiments, the user 140 may be a subject, such as, for example, an infant, child, adolescent, adult, and/or geriatric that may benefit from interacting with a robot 120, such as, for example, for educational, entertainment, and/or therapy purposes.

Some embodiments include a system 100 that corresponds to a case-based reasoning approach to learning from demonstration (CBR-LfD), which may include reusing a solution from a similar task when presented with a task to address. In some embodiments, a system 100 may model a task using locally weighted regression (LWR).

A system 100 may include an electronic device 160 and a robot 120. In some embodiments, the electronic device 160 may include a user interface 162, a processor 164, a memory 166, and/or a transceiver 168. The user interface 162 may receive a physical input from a user 140 and, in response, the electronic device 160 may generate a task-solution pair corresponding to the physical input from the user 140. The transceiver 168 may be configured to send and/or receive data and/or information to/from the robot 120 using one or more wireless and/or wired communication technologies and/or protocols. The electronic device 160 may be communicatively coupled to the robot 120 and may transmit the task-solution pair to the robot 120, which may store the transmitted task-solution pair. In some embodiments, a user datagram protocol (UDP) socket communication may be established between the electronic device 160 and the robot 120. Some embodiments include that data, such as, for example a task-solution pair, may be transmitted to the robot 120 from the electronic device 160 at a given sampling rate. Any suitable sampling rate may be used, such as, for example, data may be transmitted from the electronic device 160 to the robot 120 every 1, 2, 3, 4, 5, 6, 7, 8, 9, 10 or more minute(s). The sampling rate values provided herein are examples and are not intended to limit the scope of the invention. For example, the sampling rate may be less than 1 minute or greater than 10 minutes.

Any electronic device 160 including a processor 164 may be used herein. For example, an electronic device may include a desktop and/or stationary computer, a mobile terminal, a computing/processing device such as a wireless phone, a personal digital assistant, a smart phone, a tablet computing device, and/or other portable computing device. In some embodiments, the electronic device 160 may be a tablet computing device.

The processor 164 may be configured to execute computer program code from memory 166, described below as a computer readable storage medium, to perform at least some of the operations and methods described herein, and may be any conventional processor (s), including, but not limited to the AMD Athlon™ 64, or Intel® Core™ Duo, among others. The memory 166 may be coupled to the processor 164 and may include computer readable program code embodied therein that, when executed by the processor 164, may cause the processor 164 to receive, generate, store, and/or transmit data relating to an interaction between the user 140 and the electronic device 160. In some embodiments, the data may include a task-solution pair.

The robot 120 may be any suitable robot, such as, for example a humanoid or animal robot. In some embodiments, the robot 120 may be portable. Some embodiments include that the robot 120 is configured to demonstrate emotions, which may correspond to gestures and/or verbal responses. The emotions may be grouped as positive, negative, neutral, and/or idle emotions. In some embodiments, the robot 120 may have a passive personality, which as used herein refers to the robot 120 retracting its movements and/or emotions and waiting for its turn. For example, a robot 120 with a passive personality may wait to act (e.g., move, speak, and/or show emotion) until the user 140 provides a demonstration and/or interacts with the electronic device 160 and/or robot 120. In some embodiments, the robot 120 may act after a given time period has passed with no activity from the user 140.

The robot 120 may include one or more actuator(s) 122, one or more interaction inducing component(s) 124, one or more sensor(s) 126, a transceiver 127, a processor 128, a memory 129, and/or a power source 125. The processor 128 may be a single board computer, microcontroller, and/or other processing unit. The processor 128 may be configured for robot control, image processing, networking, data storage, and/or peripheral interfaces. In some embodiments, the processor 128 may communicate with the electronic device 160 over a USB, serial, Ethernet, wireless, or other connection. The transceiver 127 may be configured to send and/or receive data and/or information to/from the electronic device 160 using one or more wireless and/or wired communication technologies and/or protocols. The one or more actuator(s) 122 may be controlled by the processor 128. In some embodiments, one or more actuator(s) 122 may be servo motors and/or other rotational and/or linear actuation technologies. Some embodiments include that the one or more actuator(s) 122 are configured to cause a mechanical action of one or more component(s) of the robot 120. In some embodiments, the one or more actuator(s) 122 may be configured to control the mechanical action, movement, and/or motion of the robot's 120 head, neck, mouth, facial expressions, appendages (e.g., arm(s), leg(s), wheel(s), tail, etc.), eye(s) including eyelid(s) and/or eyebrow(s), and/or body configuration.

The one or more interaction inducing component(s) 124 may include, but are not limited to, movable eyes, movable eyelids, movable eyebrows, movable head, movable appendages, and/or sound generating components. The one or more interaction inducing component(s) 124 may be operatively connected to corresponding ones of the one or more actuator(s) 122. For example, an actuator 122 that is configured to control the robot's 120 eyes may be operatively connected to the robot's movable eyes.

The one or more sensor(s) 126 may be configured to detect at least one action of the user 140. The one or more sensor(s) 126 may be a camera, stereo camera, range or proximity sensor, accelerometer, vibration sensor, gyroscope, inertial measurement unit, microphone, stereo audio localizer, touch sensor, pressure sensor, temperature sensor, button, and/or other sensing modality or configuration. The one or more sensor(s) 126 may be operatively connected to the processor 128. In some embodiments, the robot 120 may include at least one eye including a camera residing inside or otherwise coupled to the eye. In some embodiments, the robot 120 may include audio and/or video recording and/or analysis. In some embodiments, the robot 120 may be configured to sense audio through a microphone and/or emit audible output through the at least one speaker. In some embodiments, the robot 120 may be configured to speak a given language, such as, for example, English, Spanish, etc.

The power source 125 may be an onboard power source such as an internal battery and/or an external power source. In some embodiments, the external power source may be a charger and may be switchable between an internal and external power supply. In some embodiments, the external power source may be a dock that the robot 120 is placed into and/or onto.

The processor 128 may be configured to execute computer program code from memory 129, described below as a computer readable storage medium, to perform at least some of the operations and methods described herein, and may be any conventional processor (s), including, but not limited to the AMD Athlon™ 64, or Intel® Core™ Duo, among others.

The memory 129 is coupled to the processor 128 and includes computer readable program code embodied therein. According to some embodiments, the memory 129 includes computer readable program code embodied therein that, when executed by the processor 128, causes the processor 128 to: receive a task; identify a similar task from a database stored in the memory 129, the database including at least one stored task-solution pair; execute the solution associated with the similar task; and/or store a new task-solution pair responsive to the robot 120 performing a solution relating to the task. In some embodiments, the memory 129 includes computer readable program code embodied therein that, when executed by the processor 128, causes the processor 128 to identify a similar task from a database stored in the memory 129 based on similarity to the task received.

Figure 2:
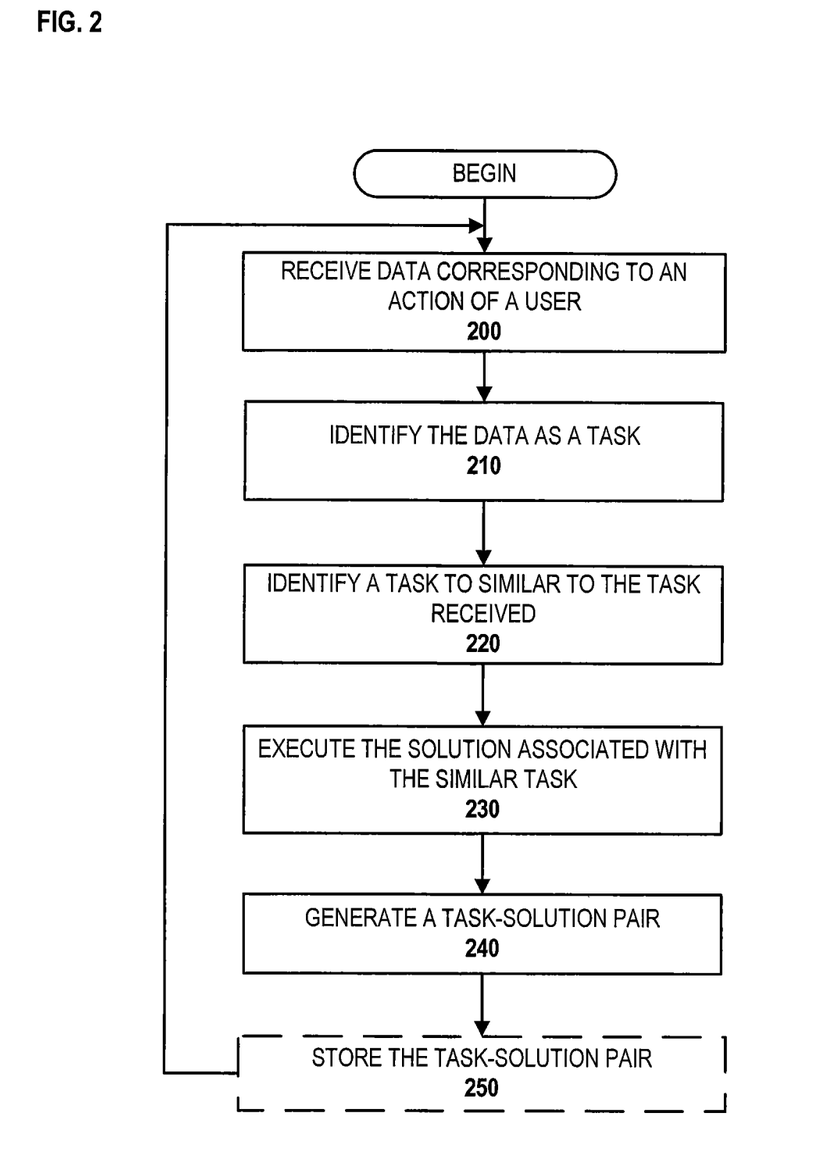
FIG. 2 is a flow diagram illustrating operations corresponding to a robot according to some embodiments of the present invention.

Reference is now made to FIG. 2, which is a flow diagram illustrating operations corresponding to a robot 120 according to some embodiments of the present invention. In some embodiments, a robot 120 may receive data corresponding to an action of a user at block 200. Some embodiments include that the processor 128 and/or robot 120 is configured to receive data corresponding to the at least one action of the user 140. The data may be received by the processor 128 and/or robot 120 and may be received from the electronic device 160 and/or received by the robot 120 observing (e.g., visual and/or audial) the user 140. At least one action of the user 140 may include, but is not limited to, verbal responses of the user 140, nonverbal responses of the user 140 (for example, posture of the user and movement of the subject's eye(s) and/or appendage(s)), and/or the performance of the user 140. In some embodiments, the processor 128 receives the data from the electronic device 160 and/or from one or more sensor(s) 126.

Some embodiments include that the processor 128 of the robot 120 receives data from the electronic device 160 on at least one interaction between the user 140 and the electronic device 160. For example, the user 140 may be involved with and/or suppose to be involved with an activity on the electronic device 160 (for example, playing a game or completing a homework assignment on the electronic device 160) and the electronic device 160 may transmit to the robot 120 a task-solution pair that corresponds to an input corresponding to the activity and the resulting output. In some embodiments, the input is a user input and/or the output is a user output. In some embodiments, the user input may be the user's action on and/or with the electronic device 160. In some embodiments, the output may be the result from the user's action on and/or with the electronic device 160 (for example, the user's score).

In some embodiments, the input is initiated when the user 140 touches and/or performs a touch gesture on the electronic device 160, such as, for example, a tablet, and the start and end coordinates corresponding to the touch and/or touch gesture may be sent to the robot 120. The robot 120 may identify and/or acknowledge that a user demonstration was given and may create a task-solution pair corresponding to the data received relating to the touch and/or touch gesture.

Some embodiments include that the processor 128 of the robot 120 receives data from one or more sensor(s) 126 on at least one interaction between the user 140 and the electronic device 160. For example, when the user 140 is involved with and/or is suppose to be involved with an activity on the electronic device 160, the one or more sensor(s) 126 may transmit to the robot 120 a task-solution pair that corresponds to an input corresponding to the activity and the resulting output. In some embodiments, the input is a user input and/or the output is a user output. In some embodiments, the user input may be the user's verbal and/or nonverbal response to the activity, such as, for example, the user's involvement with the activity, and the output may be the length of time between user interactions on and/or with the electronic device 160 (for example, the length of time between consecutive actions). In some embodiments, the input may be the result from the user's action on and/or with the electronic device 160 (for example, the user's score) and the output may be the user's response to the result (for example, the user's response to their score).

In some embodiments, the current state of the problem is encoded as the task, and the user's response to that state on the electronic device 160 is encoded as the solution. Some embodiments utilize a 2-tuple model that may be represented by the following equation:

$$C = \{D_{prob}, D_{sol}\},$$

where $D_{prob}$ is a task descriptor and $D_{sol}$ is a solution descriptor. In some embodiments, the task and solution descriptors include task features that may be represented using the following equations:

$$D_{prob} = \{f_1^p, f_2^p, \ldots, f_n^p\},$$

$$D_{sol} = \{f_1^s, f_2^s, \ldots, f_m^s\},$$

where n and m are the numbers of the task features, $f^p$, and the solution features, $f^s$, respectively. Some embodiments may include domain-dependent feature descriptors, which may be represented as follows:

$$f_i^p: \{x_i^p, attr_i^p\}, \text{ where } attr_i^p: \{T_i^p, M_{ex_i}^p, M_{dist_i}^p, w_i\},$$

and $$f_j^s: \{x_j^s, attr_j^s\}, \text{ where } attr_j^s: \{T_j^s, M_{ex_j}^s\}.$$

The feature space variables, including the feature value x and feature attributes attr may be as follows:

x: The feature value x of data type T is extracted with the method $M_{ex}$. The similarity between the two feature values may be calculated by the distance function $M_{dist}$, and the resulting similarity measure may influence the overall case similarity by the factor of w.

T: The feature data type may be in many different forms including string, integer, Boolean, floating point, and/or vectors and/or arrays of these data types.

$M_{ex}$: The feature extraction method returns x of data type T. In some embodiments, this may indicate the method of how to parse data packets sent from the electronic device 160, such as, for example, a tablet.

$M_{dist}$: The feature distance metric measures the distance between two feature values of data type T and returns a floating point value. This may result in a real numeric value for all feature types and may be represented in an n-dimensional space. In some embodiments, the returned floating point value may be normalized to $\epsilon[0, 1]$.

w: The regression weight coefficient may be trained through the system or a real value may be assigned from previous trainings. In some embodiments, a locally weighted regression (LWR) method may be used with feature-distances as an input space, and the coefficients may be specified such that they minimize the squared error summed over the nearest instances of the query feature-distance vector. In some embodiments, the LWR's target function doubles as the global retrieval function. In some embodiments, through training, the coefficient of the feature distance that less likely influence the decision of case retrieval quickly diminish.

The robot 120 may be configured to identify the data received at block 200 as the task at block 210. In some embodiments, the task corresponds to the user's performance relating to an interaction between the user 140 and the electronic device 160. Some embodiments include that the user's performance is categorized by the electronic device 160 and/or robot 120 as correct, incorrect, or inactive. In some embodiments, the task may correspond to the robot 120 interacting with the user 140, such as, for example, to congratulate and/or motivate the user 140. In some embodiments, the task may correspond to the robot 120 performing an action on and/or with the electronic device 160 that may be similar to an action performed by the user 140, such as, for example, how the user played an aspect of a game. In some embodiments, the task may correspond to the robot 120 learning a new skill from the user 140.

Some embodiments include that the task is characterized by one or more features. In some embodiments, the one or more features may correspond to an activity, such as, for example, a game, being displayed on the electronic device 160 and which the user 140 may be interacting with and/or previously interacted with. Some embodiments include that a value may be provided for each feature. In some embodiments, a feature may correspond to a certain aspect and/or characteristic in a scene on the user interface 162 of the electronic device 160. For example, a feature may correspond to the color of the background, the color of an object in the scene, the location of an object in the scene, the movement of the object (e.g., directional and/or speed), the length of contact (time and/or distance) between the user and the user interface 162 of the electronic device 160, a numerical value (e.g., the score in the case of a game or homework), etc. The value of a given feature may correspond to the number of options for that feature (for example, the number of background colors and each color is assigned a different value) and/or another metric to characterize the options for a given feature. In some embodiments, a task may be characterized by a plurality of features and each of the features of the plurality may correspond to a characteristic on the user interface 162 of the electronic device 160 that can change (e.g., move, change color, etc.) in response to an input from the user 140 and/or the robot 120. In some embodiments, the task features and/or the feature values may be selected and/or provided by the user 140 and/or a third party (for example, teacher, parent, therapist, etc.). Some embodiments include that the feature and/or feature value information may be provided by the user 140 through an Extensible Markup Language (XML) interface.

The robot 120 may identify a task similar to the task received at block 220. In some embodiments, the similar task corresponds to a task having the most similarities to the task received. Some embodiments include that the robot 120 identifies the similar task by comparing the task received to one or more tasks stored in a database, the database being stored in memory 129. In some embodiments, the most similar task stored in the database (i.e., the best match to the task received) is not identified by the robot 120 at block 220 as the similar task. Instead, the second, third, fourth, fifth, etc. most similar task is identified by the robot 120 as the similar task at block 220. By the robot 120 identifying a stored task that may not be the most similar to or best suited for the task received as the similar task, the robot 120 may take longer to learn and/or may better engage the user 140 and/or better facilitate interactions between the user 140 and the electronic device 160.

In some embodiments, the similar task is identified by a metric corresponding to recognition of a pattern and/or by determining the frequency of the task. In some embodiments, the similarity of the task may be identified through input from the user 140. Some embodiments include that the similar task is identified and/or retrieved based on a linear regression method, which may have little or no domain-specific knowledge. Some embodiments provide that the similar task is identified and/or retrieved based on a metric determined using a number of different technologies including nearest neighbor, artificial neural network, LWR, among others.

In some embodiments, the similar task is identified by estimating the distance between the task received and a stored task in the database. Some embodiments include that the distance between two tasks $C_i$ and $C_j$ is a function of distances of n task features. In some embodiments, the distance between two tasks may be calculated using the following equation:

$$\delta(C_i, C_j) = f(\delta(p_i^1, p_j^1), \delta(p_i^2, p_j^2), \ldots, \delta(p_i^n, p_j^n)),$$

where $p_i^k$ is the k-th task feature of the task $C_i$. In some embodiments, similarity may be determined assuming a general relationship of the features.

In some embodiments, estimating the distance between the task received and the stored task in the database includes mathematically weighting the distance between the task received and the stored task. Some embodiments include a weighted summation of the distance between each of the task features. In some embodiments, each of the task features is equally weighted. In some embodiments, a task feature may be given more weight relative to another task feature and in this manner the weights may be trained, which may provide for an optimized model in which the total deviation between task-solution pairs in the database is minimized. Some embodiments include that the weights of the task features are determined using locally weighted regression (LWR). Some embodiment include that the weights are learned using a number of different technologies, including artificial neural networks. In some embodiments, LWR is a derivative of the k-nearest neighbor (k-NN) classifier.

In some embodiments, identifying and/or retrieving the similar task at block 220 may be modeled as a linear sum of locally weighted task features. Some embodiments include that the weights are trained such that the overall function minimizes the cost function. In some embodiments, linear regression may be used to fit a linear function to a set of input-output pairs given a set of training examples, in which the input and output features are numeric. In some embodiments, the distances between the feature pairs may become the input variables, which may be represented as follows:

$$d = \{\delta(x_{1_i}^P, x_{1_j}^P), \delta(x_{2_i}^P, x_{2_j}^P), \ldots, \delta(x_{n_i}^P, x_{n_j}^P)\}^T,$$

where $x_{k_i}^P$ is the k-th feature, and $\delta(x_{k_i}^P, x_{k_j}^P)$ is the output of $M_{dist_k}$. The distance $\delta(x_{k_i}^P, x_{k_j}^P)$ will be abbreviated as $\delta_{ij}^j$ for simplicity. In some embodiments, the target function models a retrieval function assuming a general linear relationship of the feature distances, which may be represented using the following equation:

$$g(w, d) = \sum_{k=0}^{n} w_k \cdot \delta_{ij}^k,$$

where $w = \{w_0, w_1, \ldots, w_n\}$ is the regression coefficient vector, and $\delta_{ij}^0 = 1$. A set E may be defined as nearest-neighbor instances corresponding to $d_q$. In some embodiments, the regression coefficient vector w may be specified in order to minimize the squared error summed over the set E and may be represented using the following equation:

$$\text{Error}(w, d) = \frac{1}{2} \sum_{d \in E} (g(d) - \hat{g}(w, d))^2.$$

In some embodiments, the gradient descent method may then be used to compute w iteratively. This overall process may be based on a locally weighted regression (LWR) and may be a representative method of instance based learning approaches. In some embodiments, LWR may be applied in the feature-distance space instead of the feature space itself. Some embodiments include repeating this process for a given number of query points, and for each query point the nearest neighbor set E may be restated. In some embodiments, after training, the target function g(w, d) may be used as the global similarity measure for retrieving cases.

In some embodiments, the database includes a plurality of stored task-solution pairs that are each associated with a scoring metric and/or are each organized by a scoring metric. In some embodiments, the plurality of stored task-solution pairs may be organized and/or sorted using the scoring metric. Some embodiments include that the scoring metric corresponds to the user's performance relating to a stored task of a stored task-solution pair of the plurality of stored task-solution pairs.

The robot 120 may execute the solution associated with the similar task at block 230. In some embodiments, the solution corresponds to an action of the robot 120 responsive to the task. In some embodiments, the action of the robot 120 is a verbal and/or nonverbal response. This may provide an open dialogue between the robot 120 and the user 140. The verbal and/or nonverbal responses may convey to the user 140 that the robot 120 and user 140 are a team. Nonverbal responses may include a head nod, head shake, eye gaze, head scratch, body movement, arm movement, wheel movement, and/or leg movement. Example nonverbal responses are provided in Table 1.

TABLE 1

Example Nonverbal Robot Responses.

| Gesture | Behavioral Meaning | Description of Motion |
|---|---|---|
| Conversation | Body movements used to engage children while talking | Head nods and both arms move outward while maintaining eye contact |
| Head Nod | Back-channel signal meaning continue; okay; yes | Head moves in an up and down motion |
| Head Shake | Negative connotation; sad; no | Head moves from side to side while facing the ground |
| Tri-gaze | Eye contact distributed between three things | Eye contact the screen, child, then workstation for 3 seconds each |
| Head Scratch | Confusion; lost | Arm/hand moves back and forth next to head |
| Fast Arm | Positive connotation; approval; excitement | Arm is bent and raised next to head; arm then quickly moves downward |
| Hand Wave | Hello; goodbye | Arm is bent and raised next to head; forearm moves back and forth |
| Eye Contact | Attention is directed towards an object | Head (eyes) is aligned with a specified target |

In some embodiments, the solution executed by the robot 120 may correspond to simulating a touch gesture on the electronic device 160. The verbal response may include a positive response, a supportive response, and/or a motivational response, among others. In some embodiments, the verbal and/or nonverbal response of the robot 120 may correspond to a verbal and/or nonverbal response in the positive, negative, neutral, and/or idle emotion group. In some embodiments, the verbal response may be a supportive phrase, such as, for example, a socially supportive phrase. In some embodiments, the verbal response may correspond to a user action that is classified as correct (e.g., the user 140 correctly performed the action on the electronic device 160), incorrect (e.g., the user 140 incorrectly performed the action on the electronic device 160), or none (e.g., the user 140 performed no action on the electronic device 160) and/or may correspond to the speed at which the user action was performed on the electronic device 160. In some embodiments, the verbal response may encourage the user 140 in regard to the user's performance on an activity on the electronic device 160 (e.g., answering correctly or incorrectly, taking too long to answer, etc.). Example verbal responses are provided in Table 2.

TABLE 2

Example Verbal Robot Responses.

| Interaction | Speed | Phrase |
|---|---|---|
| Correct | Fast | "Fantastic!" |
| | | "Awesome!" |
| | | "You're really good at this." |
| | | "You really know your stuff!" |
| | | "You're a genius!" |
| | Slow | "This is hard, but we're doing great." |
| | | "Thanks for all your hard work." |
| | | "You're doing great! I had trouble with that one too." |
| | | "This is really making me think." |
| Incorrect | Fast | "Hang in there. We're almost done." |
| | | "Can you slow down a little so we can do it together?" |
| | | "Please wait for me. You're leaving me behind." |
| | | "Slow down champ." |
| | | "Wait, I didn't get to read that one." |
| | | "I'm lost. You're going too fast." |
| | Slow | "This part is very challenging." |
| | | "Don't sweat it. We'll get the next one." |
| | | "Don't worry. I had trouble with that one too." |
| | | "That one was very challenging." |
| None | Inactive | "Are you still there?" |
| | | "Don't forget about me over here." |
| | | "Don't give up on me. Come on, let's keep going." |
| | | "Let's make an educated guess." |
| | | "I was completely stumped on this one." |

Some embodiments provide that the robot 120 focuses and/or adjusts its body language (e.g., body and/or eye(s)) to be directed to the user 140 when the robot 120 verbally and/or nonverbally interacts with the user 140. In some embodiments, when the robot 120 is not verbally or nonverbally interacting with the user 140, the robot 120 may direct its attention to the electronic device 160 (e.g., watching the activity on the electronic device 160) and/or to the user 140.

In some embodiments, the task may relate to a prior user demonstration, such as, for example, a user's prior touch and/or touch gesture on the electronic device 160, such as, for example, a tablet. The robot 120 may retrieve the task-solution pair corresponding to the touch and/or touch gesture. In some embodiments, the retrieved task-solution pair may include the start and end coordinates corresponding to the touch and/or touch gesture, and the robot 120 may transmit the start and end coordinates to the electronic device 160 to provide a synthesized touch action (e.g., a touch gesture) on the electronic device 160. In some embodiments, the robot 120 may execute a movement to mimic the user demonstration (e.g., mimic using the start and end coordinates corresponding to the touch and/or touch gesture), such as, for example a coordinated hand-eye motion that may include the robot's head and/or appendages. Some embodiments include that the executed movement is computed by the robot 120 using inverse kinematics.

In some embodiments, the solution relating to the task corresponds to an action of the user 140. The action of the user 140 may be responsive to the robot 120 performing the solution associated with the similar task and/or an action subsequent to the robot 120 performing the similar task. In some embodiments, the action of the user 140 corresponds to an interaction between the user 140 and the electronic device 160. For example, the solution may be the robot 120 providing a verbal and/or nonverbal response to the user's performance, which may result in the user 140 performing an action on and/or with the electronic device 160.

Some embodiments include that the user 140 may interrupt the robot 120 when the robot 120 is executing and/or performing the solution associated with the similar task. In some embodiments, the user 140 may stop the robot's action prior to and/or during the performance of the action and the user 140 may demonstrate a solution on the electronic device 160, which may correspond to the task received by the robot 120. For example, the user 140 may stop the robot 120 prior to and/or during the performance of a touch gesture on the electronic device 160 and show the robot 120 how to perform the same and/or a different touch gesture on the electronic device 160. This may allow the user 140 to correct the robot's behavior at the moment learning is taking place and/or may provide a means to facilitate and/or engage the user 140 in the activity on the electronic device 160.

The robot 120 may generate a task-solution pair at block 240. In some embodiments, the task of the task-solution pair corresponds to the received task and the solution corresponds to the executed solution.

Some embodiments include evaluating the task-solution pair generated at block 240 to determine if it should be stored in the database. In some embodiments, the processor 128 and/or robot is/are configured to determine if a task-solution pair is within a threshold of at least a portion of the stored task-solution pairs. Responsive to determining that a new task-solution pair is within the threshold of at least a portion of the stored task-solution pairs, the processor 128 and/or robot may not store and/or may remove the new task-solution pair from the database. In some embodiments, the threshold is a distance threshold that may correspond to a distance in dataspace between different task-solution pairs. For example, in some embodiments, assuming the new task-solution pair would be and/or is stored, then if the number of stored task-solution pairs within a given distance and/or cluster is greater than a given threshold, then at least one of the stored task-solution pairs may be removed from the database. In some embodiments, the new task-solution pair may be removed and/or not stored. In some embodiments, the oldest stored task-solution pair may be removed from the database and the new task-solution pair may be stored. In some embodiments, the stored task-solution pair that is the least similar to the other stored task-solution pairs with the given distance and/or cluster (i.e., the outlier) is removed. Some embodiments include that if the new task-solution pair generated at block 240 is determined to be too similar to a previously stored task-solution pair, then the new task-solution pair may be removed from and/or not stored in the database.

The robot 120 may store the task-solution pair at block 250. In some embodiments, the task-solution pair stored at block 250 is different than a stored task-solution pair in the database. Some embodiments include storing a task-solution pair responsive to the robot learning a solution relating to the task.

Some embodiments include that the task received and the similar task are the same. In some embodiments, the robot performs a new solution relating to the task received, and, responsive to the robot performing the new solution relating to the task, the new task-solution pair is stored.

Some embodiments include that the task received and the similar task are different. In some embodiments, the robot performs the solution relating to the similar task, and, responsive to the robot performing the solution relating to the similar task, the new task-solution pair is stored.

In some embodiments, storing the task-solution pair at block 250 includes organizing and/or classifying the task-solution pair in the database. For example, the most recent task-solution pair may be stored in the database in a particular location (e.g., cluster, group, distance on a continuum, etc.) and/or may be given a particular value based on similarity to one or more stored task-solution pairs in the database. In some embodiments, the most-recent task-solution pair is organized and/or classified in the database based on the features associated with the task of the task-solution pair. In some embodiments, a task-solution pair is organized and/or classified in the database by comparing the features of the associated task of the task-solution pair to the features associated with tasks of the respective stored task-solution pairs in the database.

Figure 3:
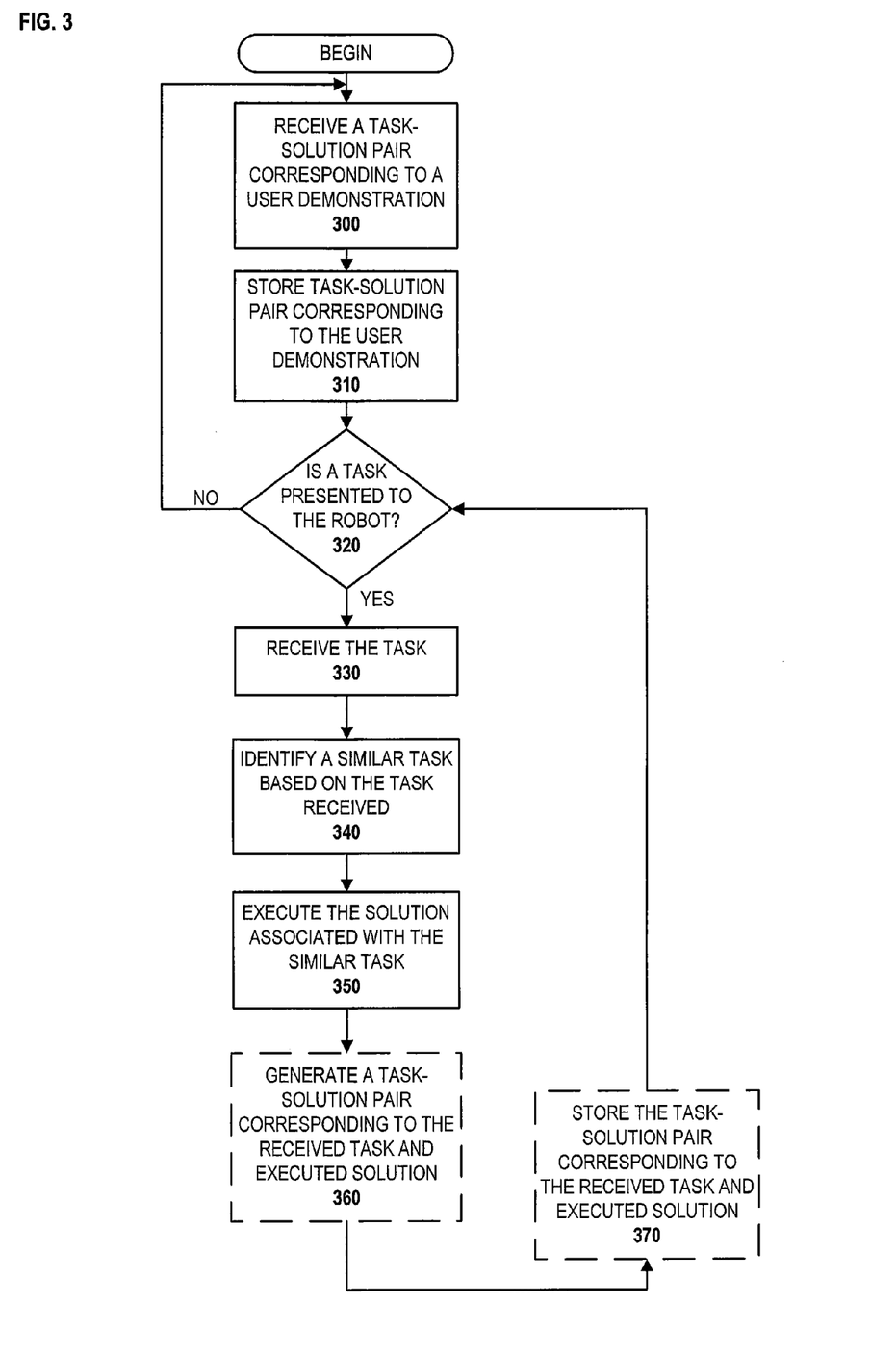
FIG. 3 is a flow diagram illustrating operations corresponding to systems, methods, computer program products, and apparatus according to some embodiments of the present invention.

Reference is now made to FIG. 3, which is a flow diagram illustrating operations corresponding to systems, methods, computer program products, and apparatus according to some embodiments of the present invention. The operations of the present embodiment will be described with reference to a user 140 demonstrating a task on an electronic device 160, such as a tablet, to a robot 120, but it is understood that the operations are not limited to such an embodiment. The robot 120 may receive a task-solution pair corresponding to a user demonstration at block 300. The user demonstration may correspond to an interaction between the user 140 and the electronic device 160, such as the user 140 performing an action on the electronic device 160. For example, in some embodiments, the user 140 may be performing an action (e.g., playing a game) on the electronic device 160 and through observing the user 140 and/or receiving data from the electronic device 160 on the user's interaction with the electronic device 160, the robot 120 may learn how to perform the action (e.g., play the game). As described above in reference to FIG. 2, the robot 120 may receive the task-solution pair from the electronic device 160 and/or by observing the user 140.

Responsive to receiving the task-solution pair corresponding to the user demonstration, the robot 120 may store the task-solution pair corresponding to the user demonstration at block 310. Storing the task-solution pair at block 310 may be include evaluating the task-solution pair to determine if it should be stored and/or organizing and/or classifying the task-solution pair in the database. Storing the task-solution pair at block 310, including evaluating, organizing, and/or classifying the task-solution pair, may be as described above in reference to FIG. 2 and duplicate discussion thereof may be omitted herein for the purpose of discussing FIG. 3.

Referring again to FIG. 3, the robot 120 may determine if a task is presented to the robot 120 at block 320. In some embodiments, the task may correspond to an action of the user 140 relating to the electronic device 160. For example, in some embodiments, the task may be for the robot 120 to perform the same and/or a similar action to the action performed by the user 140 on the electronic device 160 (e.g., playing the game). If no task is presented to the robot 120, then the robot 120 may continue to receive task-solution pairs at block 300 and/or store task-solution pairs at block 310.

If a task is presented to the robot 120, then the robot 120 may receive the task at block 330, identify a similar task based on the task received at block 340, execute the solution associated with the similar task at block 350, generate a task-solution pair corresponding to the received task and executed solution at block 360, and/or store the task-solution pair corresponding to the received task and executed solution at block 370. Each of these operations may be as described above in reference to FIG. 2 and duplicate discussion thereof may be omitted herein for the purpose of discussing FIG. 3.

The robot 120 may continue to evaluate and/or determine if a task is presented to the robot 120. If no task is presented, then the robot may continue to receive task-solution pairs at block 300 and/or store task-solution pairs at block 310. In some embodiments, the robot 120 has a passive personality and may not take any action (e.g., verbal and/or nonverbal response) until a task is presented. If a task is presented, then the robot 120 may act as described in blocks 330 to 370. In some embodiments, the robot 120 may act if there has been a given time period of user inactivity and/or the robot 120 may be configured to identify the inactivity as the task.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

That which is claimed is:

1. A system comprising:
    a robot communicatively coupled to an electronic device comprising a touchscreen, the robot comprising:
        a plurality of interaction inducing components, wherein each interaction inducing component is respectively coupled to one of a plurality of actuators, wherein each actuator is configured to cause a mechanical action of the respectively coupled interaction inducing component;
        at least one sensor configured to detect at least one user action;
        a processor; and
        a memory coupled to the processor, the memory comprising computer readable program code embodied therein that, when executed by the processor, causes the processor to perform operations comprising:
            receiving data indicative of a first task from the electronic device and/or from the at least one sensor;
            identifying, based on similarity to the first task, a second task stored in a database, wherein the second task is associated with a solution as part of a task-solution pair stored in the database, wherein the database includes a plurality of stored task-solution pairs, and wherein the solution includes start and end coordinates corresponding to a touch gesture on the touchscreen; and
            executing the solution associated with the second task, including providing a synthesized touch action to the electronic device based on the start and end coordinates; wherein the solution corresponds to an action of the robot responsive to the first task.

2. The system of claim 1, wherein the data includes an indication of the at least one user action.

3. The system of claim 1, wherein the memory further comprises computer readable program code embodied therein that, when executed by the processor, causes the processor to store a new task-solution pair responsive to the robot performing a solution associated with the first task, and wherein the new task-solution pair is different than the task-solution pairs stored in the database.

4. The system of claim 3, wherein the first task and the second task are similar tasks, wherein the robot performs a new solution relating to the first task, and wherein, responsive to the robot performing the new solution associated with the first task, the new task-solution pair is stored.

5. The system of claim 3, wherein the first task and the second task are different tasks, wherein the robot performs the solution associated with the first task, and wherein, responsive to the robot receiving the data and performing the solution associated with the second task, the new task-solution pair is stored.

6. The system of claim 1, wherein the second task is identified by determining that a number of similarities between the first task and the second task is greater than all other number of similarities between the first task and relative to at least one stored task in the database.

7. The system of claim 1, wherein the second task is identified by a metric corresponding to pattern recognition.

8. The system of claim 3, wherein the new task-solution pair is stored responsive to the robot learning a solution associated with the first task.

9. The system of claim 1, wherein the solution associated with the second task corresponds to the at least one user action, and wherein the at least one user action is responsive to the robot performing the solution associated with the second task and/or an action subsequent to the robot performing the second task.

10. The system of claim 9, wherein the at least one user action responsive to the robot performing the solution associated with the second task and/or an action subsequent to the robot performing the second task corresponds to an interaction between a user and the electronic device.

11. The system of claim 1, wherein each task-solution pair of the plurality of stored task-solution pairs is associated with a scoring metric.

12. The system of claim 11, wherein the scoring metric associated with each task-solution pair corresponds to performance by a user relating to the task of each stored task-solution pair of the plurality of stored task-solution pairs.

13. The system of claim 11, wherein the processor is further configured to store a new task-solution pair responsive to the robot performing a solution associated with the first task, and determine if the new task-solution pair is within a threshold of at least a portion of the plurality of stored task-solution pairs, and wherein, responsive to determining that the new task-solution pair is within the threshold of at least a portion of the plurality of stored task-solution pairs, disregarding the new task-solution pair.

14. The system of claim 1, wherein the first task corresponds to performance by a user relating to an interaction between the user and the electronic device.

15. The system of claim 14, wherein the performance by the user is categorized as correct, incorrect, or inactive.

16. The system of claim 1, wherein the action of the robot comprises a verbal response and/or a nonverbal response.

17. The system of claim 16, wherein the nonverbal response includes at least one of a head nod, head shake, eye gaze, head scratch, arm movement, wheel movement, and leg movement.

18. The system of claim 16, wherein the verbal response includes at least one of a positive response, a supportive response, and a motivational response.

19. A method of increasing user participation in an activity performed on an electronic device comprising a touchscreen, the method comprising:
    providing a robot comprising:
        a plurality of interaction inducing components, wherein each interaction inducing component is respectively coupled to one of a plurality of actuators, wherein each actuator is configured to cause a mechanical action of the respectively coupled interaction inducing component;
at least one sensor configured to detect at least one user action;
a processor; and
a memory coupled to the processor, the memory comprising computer readable program code embodied therein that, when executed by the processor, causes the processor to:
  receive data indicative of a first task from the electronic device and/or from the at least one sensor;
  identify, based on similarity to the first task, a second task stored in a database, wherein the second task is associated with a solution as part of a task-solution pair stored in the database, wherein the database includes a plurality of stored task-solution pairs, and wherein the solution includes start and end coordinates corresponding to a touch gesture on the touchscreen; and
  execute the solution associated with the second task, including providing a synthesized touch action to the electronic device based on the start and end coordinates; wherein the solution corresponds to an action of the robot responsive to the first task; and
wherein the robot facilitates the user participation in the activity, thereby increasing the user participation in the activity on the electronic device.

\* \* \* \* \*

UNITED STATES PATENT AND TRADEMARK OFFICE
CERTIFICATE OF CORRECTION

PATENT NO.       : 9,846,843 B2                                    Page 1 of 1
APPLICATION NO.  : 14/524405
DATED            : December 19, 2017
INVENTOR(S)      : Howard et al.

It is certified that error appears in the above-identified patent and that said Letters Patent is hereby corrected as shown below:

In the Specification

Column 12, Line 7: Please correct "$\delta_{ij}^{\ j}$" to read --$\delta_{ij}^{k}$--

Signed and Sealed this
Twenty-sixth Day of June, 2018

Andrei Iancu
*Director of the United States Patent and Trademark Office*